United States Patent
Robertson

(10) Patent No.: US 11,818,829 B2
(45) Date of Patent: Nov. 14, 2023

(54) METHOD FOR CREATING A RAPIDLY CHANGING ENERGY SHELL OF QUANTUM FLUCTUATIONS ABOUT MASSES FOR ACCELERATION WITHOUT MASS EJECTION

(71) Applicant: Glen A. Robertson, Madison, AL (US)

(72) Inventor: Glen A. Robertson, Madison, AL (US)

(*) Notice: Subject to any disclaimer, the term of this patent is extended or adjusted under 35 U.S.C. 154(b) by 305 days.

(21) Appl. No.: 17/473,969

(22) Filed: Sep. 13, 2021

(65) Prior Publication Data
US 2023/0080413 A1   Mar. 16, 2023

(51) Int. Cl.
*H05H 5/00* (2006.01)

(52) U.S. Cl.
CPC ..................... *H05H 5/00* (2013.01)

(58) Field of Classification Search
CPC ........... H05H 5/00; F03G 7/135; F03G 7/125; G01L 9/0005; G01K 7/343
See application file for complete search history.

(56) References Cited

U.S. PATENT DOCUMENTS 4,545,254 A * 10/1985 Lawless ............... G01L 9/0005
                                                     374/E7.038
11,501,917 B2 * 11/2022 Phillips ................ H01G 4/18
(Continued)

FOREIGN PATENT DOCUMENTS

DE    102012016225 A1 *  3/2014  ........... H02N 11/008
WO    WO-02095451 A1 *  11/2002  ............... G01V 7/00

OTHER PUBLICATIONS

High energy collision without fine tuning: Acceleration and multiple collisions of shells in a bound system, Takafumi Kokubu, Sep. 11, 2020.*

(Continued)

*Primary Examiner* — Abdullah A Riyami
*Assistant Examiner* — Syed M Kaiser

(57) ABSTRACT

A method for rapidly changing the energy shell of quantum fluctuations (ESQFs) about a mass that changes fast enough to produce time dilation and retardation between the ESQFs on opposite sides of the mass, to produce acceleration as was shown under a new quantum gravity model. The method includes, a three layered capacitor system comprising an electrostatic (ES) capacitor, i.e., a dielectric with no outer electrode, on an AC capacitor, on a DC capacitor. The AC capacitor shares an electrode on one side with the ES capacitor and on the other side with the DC capacitor. The ES capacitor has the electrodeless dielectric material surface adjacent to the upper ESQFs of the layered capacitor system and the DC capacitor has the (earth) ground surface adjacent to the lower ESQFs of the layered capacitor system. When the AC and DC voltages are applied to the layered capacitor system, an asymmetry is produced between the upper and lower ESQFs to cause acceleration on the layered capacitor system. Applying quadrants of the layered capacitor system on the surface of a craft, the craft can be accelerated in any direction, where when optimally operated to only control the ESQFs outside the craft, objects in the cavity will not feel any affects from the layered capacitor systems nor experience any inertia due to the acceleration on the craft.

12 Claims, 6 Drawing Sheets

(56) References Cited

U.S. PATENT DOCUMENTS

2010/0226155 A1* 9/2010 Hanington ............ H02M 7/106
　　　　　　　　　　　　　　　　　　　　　363/125
2020/0255167 A1* 8/2020 Aurigema .............. B64G 1/409
2020/0321514 A1* 10/2020 Sadr .................... H02N 11/008

OTHER PUBLICATIONS

Characterization of Plasma Formation and Mass Ejection in Exploding Foil Initiators, Alexander J. Borman, IEEE Transactions on Plasma Science, vol. 49, No. 3, Mar. 2021.*

* cited by examiner

METHOD FOR CREATING A RAPIDLY CHANGING ENERGY SHELL OF QUANTUM FLUCTUATIONS ABOUT MASSES FOR ACCELERATION WITHOUT MASS EJECTION

BACKGROUND

The present invention relates to a method for creating a rapidly changing energy shell of quantum fluctuations (ESQFs) about masses for acceleration without mass ejection based on a new quantum gravity model, derived from a historical standpoint, that there is considerable theoretical and experimental basis behind the idea that everything that surrounds us can be described as a macroscopic collection of fluctuations, vibrations, and oscillations associated with quantum mechanical fluctuations and quantum energy fluctuations. That is, all masses are composed of quantum mechanical fluctuations—super-imposed on quantum energy fluctuations and surrounded by a medium of quantum energy fluctuations. Whereby, the combined mechanical and energy fluctuations in the quantum energy field in masses and the quantum energy fluctuations in the quantum energy field surrounding masses are two separate quantum energy fields. As such, the combined quantum mechanical and energy fluctuations in masses produces a thin energy shell of quantum fluctuations (ESQFs), emanating from the outer surface of masses, that is entangled to a mass's internal and external quantum energy fields to mediate differences that occur between the mass's internal and external quantum energy fields.

The new quantum gravity model is partially discussed herein as taken from the online peer reviewed paper by the inventor entitled "Quantum Gravity as a Quantum Warp Field," on Research Gate, the General Science Journal, and LinkedIn websites, wherein it shows that an ESQFs can be evaluated at every radial distance from all masses in the Universe, composing a quantized quantum energy field of ESQFs like the shells about an onion throughout the Universe (although a bit muddled due to interference between masses) and impart features like spacetime within general relativity. That is, the Universe "quantum energy field" in this new quantum gravity model is not the "vacuum energy field" as discussed in literature, but the underlying quantum energy field that composes spacetime. As such, when asymmetric changes occur in the ESQFs near and about the surface of a mass, the asymmetric ESQFs behaves like a warp field (expanding and contracting the external quantum field about the mass) to produce acceleration—gravitationally or by other acceleration means. Not unlike the warp field as presented in the 1994 paper by M. Alcubierre, entitled "The warp drive: hyper-fast travel within general relativity," *Class. Quant. Grav.* 11, pg. L73-L77.

Further, the ESQFs at the surface about all masses is the same thin-shell about all masses as discussed in the 2004 paper by J. Khoury, and A. Weltman, entitled "Chameleon Cosmology," *Phys. Rev. D*, 69, p. 044026, (2004), which is a new gravity model based on the density environment about mass, wherein the thin shell has an outer radius $\overline{R}$ a bit greater than the radius R of the mass and where the difference $\Delta R = \overline{R} - R$ is the thin-shell thickness. In general, the new quantum gravity model converts "Chameleon Cosmology" into an acceleration model, by rapidly changing the density of the quantum energy field in a mass, to asymmetrically change the ESQFs about the mass, to accelerate the mass. This is actually what occurs in rocketry, as the gases accelerated in the rocket's nozzle produces a rapidly changing quantum energy field density, to cause the ESQFs about the rocket to become asymmetric.

Under the new quantum model, the thin shell thickness $\Delta R$ under "Chameleon Cosmology" was shown to be the wavelength $\lambda$ of the quantum energy in the ESQFs (thin shell), where the quantum energy in the ESQFs about masses, in the plane of motion (forward to aft-ward), behave much like two opposing Casimir cavities with the mass being centered between them and free to move. Whereby, when the quantum energy in the two opposing Casimir cavities are asymmetric, i.e., the quantum energy in one Casimir cavity (aft-ward ESQFs) is higher than the quantum energy in the other Casimir cavity (forward ESQFs), the mass accelerates (forward), within the outer radius R of the asymmetric ESQFs, with the reverse true.

As the mass contains an internal quantum energy field, the acceleration of the mass's internal quantum energy field keeps a quantum energy pressure on the ESQFs, to cause the asymmetry of the ESQFs about the mass to remain, i.e., inertia—to kept the mass accelerating.

THEORY

In the new gravity model, the Universe quantum energy field is not a charged EM fields, but the uncharged quantum energy field that composes spacetime. Therefore, operating on the external quantum field about a mass with EM field is not possible, unless there are masses in the external quantum energy field about a mass that are charged; noting that operating on charged particles in a quantum energy field is a quantum mechanical process. This is somewhat the notion behind using charged "virtual particles" under vacuum energy models, as the ZPF model in prior art.

As previously noted, the quantum energy field in a mass contains both quantum mechanical and quantum energy fluctuations, where under the new quantum gravity model, the surface ESQFs was shown to be proportion to a mass's density, which constraints the quantum mechanical fluctuations in the mass. That is, a mass's density is strongly coupled to the quantum mechanical fluctuations in the mass, but loosely coupled to the quantum energy fluctuations in a mass.

In laymen terms, one can say that the quantum mechanical fluctuations that produce a masses density squeezes quantum energy fluctuations into the ESQFs about a mass. Therefore, as the quantum mechanical and quantum energy fluctuations in the quantum energy field in masses are intertwined (loosely coupled), one only need to operate on the quantum mechanical fluctuations in a mass to increase or decrease the quantum energy fluctuations in the ESQFs about a mass. And, if done in an asymmetric manner, acceleration can be imposed on the mass.

One such method is the present invention, wherein the quantum mechanical process known as momentum having similarity to the Newton's Cradle is used. In the Newton's Cradle, a first accelerated mass hits a series of stationary masses confined by the other masses in series with only the unconfined mass at the opposite end being accelerated. That is, the momentum in the first accelerated mass's ESQFs is transferred through the ESQFs to the adjacent mass's ESQFs in series and there on to the ESQFs of the unconfined mass at the opposite end, causing it to accelerate.

In the present invention, particulates in a mass are accelerated. However, the accelerated particulates do not leave the mass. Instead the accelerated quantum energy (i.e., momentum) in the ESQFs about the particulates is transferred to the surface ESQFs about the mass in the direction of motion. This causes the ESQFs in the direction of the internal accelerated quantum energy field to increase in thickness, increasing the wavelength λ of the quantum energy in the ESQFs, whereby decreasing the quantum energy in the ESQFs. At the same time, the internal accelerated quantum energy field causes the ESQFs in the opposite direction of motion to decrease in thickness, decreasing the wavelength λ of the quantum energy in the opposite ESQFs, whereby increasing the quantum energy in the ESQFs. This differential in the quantum energies in the ESQFs produce an asymmetric ESQFs about the mass in the direction of motion of the internal accelerated quantum energy field, to cause the mass to accelerate.

This is the same inertia model as previously discussed, where the acceleration of the mass's internal quantum energy field keeps a quantum energy pressure on the ESQFs, to cause the asymmetry of the ESQFs about the mass to remain—to kept the mass accelerating.

MODEL

In accordance to the new quantum gravity model, the acceleration of a mass (r) is due to the asymmetric change in the unaccelerated wavelength $\lambda_r$ in the mass's ESQFs, producing a forward (FWD) ESQFs quantum wavelength $(\lambda_r)_{FWD}$ that is different from the aft-ward (AFT) ESQFs quantum wavelength $(\lambda_r)_{AFT}$ as defined by the direction of motion being forward. Whereby, the acceleration a of the mass can be given in relationship to the wavelengths, $(\lambda_r)_{FWD}$ and $(\lambda_r)_{AFT}$ according to $$a_r \approx \kappa[(\lambda_r)_{AFT}^{-4} - (\lambda_r)_{FWD}^{-4}]Q_\lambda R_g, \quad \text{(Equation 1)}$$

where κ is a geometric factor (equal to 4π/3 for spherical masses), $R_g$ is the radius of the dominate local gravitational mass, $$Q_\lambda = (4\pi^2 \hbar/c)G \approx 9.268 \times 10^{52} \, m^4/s^2 \quad \text{(Equation 2)}$$

is a constant that is directly related to the Newtonian constant of gravitation G. The radius $R_g$ of the local dominate gravitational mass is important as it establishes the local external quantum field $\phi_g$ that the mass is accelerated in.

In the present invention, the forward and aft-ward wavelengths $(\lambda_r)_{FWD}$ and $(\lambda_r)_{AFT}$ are defined with respect to the change in the density of the quantum energy field within a mass's ESQFs outer radius $\overline{R}$ (caused by the accelerated particulates), to asymmetrically change the ESQFs about the mass, to accelerate the mass. The forward and aft-ward wavelengths are given in relationship to the densities by, $$(\lambda_r)_{AFT} \approx [(4\pi^2 \hbar/c)\rho_{AFT}^{-1}]^{(1/4)}$$

$$(\lambda_r)_{FWD} \approx [(4\pi^2 \hbar/c)\rho_{AFT}^{-1}]^{(1/4)} \quad \text{(Equation 3)}$$

where $\rho_{AFT}$ is the density of the aft-ward quantum energy field and $\rho_{FWD}$ is the density of the forward quantum energy field within the mass's ESQFs outer radius $\overline{R}$, such that when $\rho_{AFT} > \rho_{FWD}$, $(\lambda_r)_{FWD} > (\lambda_r)_{AFT}$ with the reverse true. Given $(\lambda_r)_{FWD} > (\lambda_r)_{AFT}$, the mass is accelerated forward, per Equation 1. In like to opposing Casimir cavities, the quantum energy $(E_r)_{FWD} = hc/(\lambda_r)_{FWD}$ in the forward ESQFs is less than the quantum energy $(E_r)_{AFT} \approx hc/(\lambda_r)_{AFT}$ in the aft-ward ESQFs. Whereby, the associate quantum energy pressures are unbalanced, causing the mass to accelerate, in the direction away from the higher quantum energy in the aft-ward ESQFs.

Combining Equations 1-3 yields the mass's acceleration as $$a_r \approx \kappa[(\rho_r)_{AFT} - (\mu_r)_{FWD}]GR_g. \quad \text{(Equation 4)}$$

Under the present invention, the accelerated particulates in the accelerated mass are electrons accelerated under electrostatic means. As such, the accelerated mass contains a three layered capacitor system composed of an electrostatic (ES) capacitor, i.e., a dielectric with no outer electrode, on an AC capacitor, on a DC capacitor. In this stacked configuration, the AC capacitor shares an electrode with the ES capacitor on one side and the DC capacitor on the other side, with the other electrode on the DC capacitor serving as the (earth) ground (EG) or the base ground of the three layered capacitor system.

The absence of the outer electrode on the dielectric material of the ES capacitor prevents the buildup of electrons on the outer surface of the dielectric material, so that the ESQFs on the surface of the dielectric material can change without impedance from surface electrons, i.e., absorbing the energy (momentum) in the accelerated quantum energy field to produce a collective voltage potential across the dielectric. Whereby, a space charge is formed in the dielectric material of the electrostatic capacitor, when a voltage is applied to the AC capacitor. As such, the AC capacitor serves to provide the energy to accelerate the quantum energy field in the dielectric material of the ES capacitor. The DC capacitor serves to shield the electrical energy from the AC capacitor.

Since the voltage on the AC capacitor is oscillatory (AC), an oscillatory (AC) displacement current is produced in the dielectric material of the ES capacitor. The oscillatory (AC) displacement current is in fact the accelerated quantum energy field, which is first accelerated in one direction by the voltage applied to the AC capacitor to either increase of decrease the quantum energy in the ESQFs at the electrodeless surface of the dielectric material, then allowed to relax back into the dielectric material as the voltage returns to zero, which allows the ESQFs at the electrodeless surface of the dielectric material to return to its normal quantum energy level.

In similarity to rapidly changing electrons that produce electric and magnetic fields that are time varying to produce time dilation and retardation under Lienard-Wiechert potentials, under this new quantum gravity model there are overlapping quantum energy fields; the quantum energy field in the three layered capacitor system and the quantum field in the ESQFs about the three layered capacitor system. As such, there is a ESQFs retardation across the three layered capacitor system. That is, a small reaction time $\Delta t = \Delta \overline{R}_r / c = \Delta \lambda_r / c$ is induced between the ESQFs at the electrodeless surface of the dielectric material and the ESQFs at the surface of the (earth) ground (EG), corresponding to a change $\Delta \overline{R}_r = \Delta \lambda_r$ to the three layered capacitor system's ESQFs outer radius with a phase shift $\omega \Delta t$ from the normal ESQFS outer radius $\overline{R}_r$ of the accelerated mass. This infers a retardation time $t' = t - \Delta t$, which results in the change in the ESQFs at the electrodeless surface of the dielectric material dominating over the ESQFs at the surface of the (earth) ground (EG) in the overlapping time dilated quantum energy fields about the three layered capacitor system. That is, there is no change to the ESQFs at the surface of the (earth) ground (EG) during the retardation time.

Time dilation and retardation is a key feature in the present invention, as it allows the acceleration on the dielectric material of the ES capacitor to be given from Equation 4, with respect to Equation 1, as $$a_{ES} \approx \kappa(\Delta \lambda_{ES})Q_\lambda R_g \approx \kappa(\lambda \rho_{ES})GR_g; \quad \text{(Equation 5)}$$

where $\Delta \lambda_{ES}$ is the change to the quantum energy wavelength in the ESQFs at the surface of the dielectric material of the ES capacitor and $\Delta\rho_{ES}$ is the change in the density of the quantum energy field in the dielectric material of the ES capacitor.

From the earlier acceleration model of the new quantum gravity model, for example, from the paper by the inventor entitled "The Chameleon Solid Rocket Propulsion Model," AIP CP1208, *SPESIF*, (2010), the density change in the dielectric material of the electrostatic capacitor (EC) is given as:

$$\Delta\rho_{ES} \approx \left(\frac{a_e}{g}\right)\rho_{QEF}, \quad \text{(Equation 6)}$$

where g is the acceleration of gravity of the local environment (i.e., earth), $\rho_{QEF}$ is the magnitude of the density of the accelerated quantum energy field in the dielectric material of the ES capacitor.

The magnitude of the displacement current, and therefore the magnitude of the change in the quantum energy field density distribution, is directly related to the electron charge on the shared electrode with the AC capacitor. Therefore, the magnitude of the acceleration of the quantum energy field is taken to be approximately equivalent to the magnitude of the acceleration $a_e$ of an electron in the applied electric field E=V/d to the AC capacitor, given by:

$$a_e \approx \kappa_{ES}(q_e/m_e)E/t = \kappa_{ES}(q_e/m_e)(V/d_{ES})/t \approx v_e/t, \quad \text{(Equation 7)}$$

where $\kappa_{ES}$ is a characteristic factor that serves as a combination all the characteristic of the dielectric material that will affect the electron drift velocity $v_e$, $q_e$ is the electron charge, $m_e$ is the electron mass, V is the magnitude of the applied AC voltage, and $d_{EC}$ is the thickness of the dielectric material of the electrostatic capacitor, t is the time of applied voltage to the AC capacitor, and where the drift velocity $v_e$ is given from Equation 7 as $$v_e \approx \kappa_{ES}(q_e/m_e)(V/d_{ES}); \quad \text{(Equation 8)}$$

noting that characteristic factor $\kappa_{ES}$ will affect the time dilation and retardation and could be a function of the time t.

The magnitude of the density $\rho_{QEF}$ of the accelerated quantum energy field in the dielectric material of the ES capacitor can be taken to be a function of the electron density on the shared electrode with the AC capacitor, given by:

$$\rho_{QEF} \cong \rho_e \approx \pm N \cdot m_e/A_{AC} \cdot d_e \quad \text{(Equation 9)}$$

where N is the number of electrons, added (+) or subtracted (−), $A_{AC}$ is the area of the shared electrode of the AC capacitor, $d_e$ is the average thickness of the electrons on the surface of the shared (ES) electrode of the AC capacitor, and where the ± sign indicates whether the electrons are added (+) (increased) or removed (−) (decreased). Noting that the number of electrons N (added or removed) is related to the ± voltage V applied to the shared electrode of the AC capacitor.

The magnitude of the number of electrons can be estimated by:

$$\pm N \approx \varepsilon_r \varepsilon_0 (A_{AC}/d_{AC})(\pm V/q_e) \quad \text{(Equation 10)}$$

where $\varepsilon_0$ is the vacuum permittivity, $\varepsilon_r$ is the relative permittivity of the dielectric material in the AC capacitor, and $d_{AC}$ is the thickness of the dielectric material in the AC capacitor.

The acceleration on the electrostatic capacitor is an impulse. Therefore, the time-averaged acceleration on the electrostatic capacitor is a function of the time rate of change $t_I$ of the added (+N) or increasing (I) electron density on the shared electrode of the AC capacitor, or the time rate of change $t_D$ of the removed (−N) or decreasing (D) electron density on the (shared EC) electrode of the AC capacitor.

Generally, $t_I = t_D = t$, such that the frequency f of the applied AC voltage can be given as f≈1/t. Whereby, using equation 5-7, the time averaged acceleration on the electrostatic capacitor is given as:

$$a_{ES} \approx \kappa\left[\left(\frac{v_e f}{g}\right)\rho_{QEF}\right]GR_g \approx \kappa\left(\frac{\rho_e}{\rho_g}\right)v_e f. \quad \text{(Equation 11)}$$

where $\rho_g$ is the density of the local gravitational mass and $v_e f$ is the oscillatory acceleration of the quantum energy field.

Given that the three layered capacitor system would be place about a mass (i.e., craft), the total mass $m_r$ (of the craft) is enclosed in the ESQFs, which is being changed by the accelerated quantum energy field in the dielectric of the ES capacitor, due to time dilation and retardation. Whereby, the force or thrust on the total mass is given by:

$$T_{+V} = -T_{-V} \approx -m_r |a_{ES}|; \quad \text{(Equation 12)}$$

noting that the direction of the acceleration on the dielectric in the ES capacitor is opposite to the sign of the applied AC voltage (±17).

PRIOR ART

The present invention has some resemblance to the electromagnetic device as presented in the 1949 papers by J. Slepian, entitled "Electromagnetic Spaceship," *Electric Essay*, pg. 145-146, February; and the follow on paper entitled "Spark-Gap in Wonderland" *Electric Essay*, pg. 245, March. Except that a time varying electromagnetic field was applied to cause electrons to accelerate in the E×B direction to produce a time varying accelerated quantum energy field, to produce a time dilated and retarded ESQFs in the E×B direction. Experiments resembling the Slepian device, have been reported by James F. Woodward and Peter Vandeventer in the papers (and references therein) entitled "Mach's Principle, Flux Capacitors, and Propulsion," AIP CP813, *STAIF*, 2006; and by Hector H. Brito and Sergio A. Elaskar, in the paper (and references therein) entitled "Overview of Theories and Experiments on Electromagnetic Inertia Manipulation Propulsion," AIP CP746, *STAIF*, 2005. In difference to the Slepian device and of interest to the present invention is that a dielectric material was needed to see any thrusting effect. The dielectric material used in both experiments was Barium Titanate, a dielectric that is non-linear in the electric and magnetic field as reported by the inventor in the paper entitled "Electromagnetic Nonlinearity in the Dielectric Medium of Experimental EM Impulse-Momentum Systems" AIP CP813, *STAIF*, 2006. Effectively, Barium Titanate is a manmade material and therefore can be considered a Meta-material.

The present invention also has some resemblance to the two layered superconductor reported by Evgeny Podkletnov and Giovanni Modanese in the paper entitled "Impulse Gravity Generation Based on Charged YBa2Cu3O7.x Superconductor with Composite Crystal Structure," arxiv.org, physics/0108005, (2001). Except a charged two layered, top seeded melt textured, Type II, YBCO superconductor was used. The two layered structure would behave in similar to capacitor to store charges, which could have been enhanced by the top seeded melt texturing process, which would have cause Josephson junction layering in the two layered superconductor. Josephson junctions behave like capacitors, but allow electron pair to cross at speeds greater than light speed, i.e., the Hartman Effect. The effect of Josephson junction on the production of a gravity like force is discussed by the inventor in the chapter (4) entitled "Quantum Effects in the Type II Superconductor that Lead to Power Radiated in Gravitational Waves," *Gravity-Superconductor Interactions: Theory and Experiment*, Editors— Giovanni Modanese and Glen A. Robertson, Bentham Books, 2012. This experiment was reported to have produced a gravity like force when discharged. The experimenter Evgeny Podkletnov in private conversations with NASA, where the inventor was present, reported that the superconductor emitted two waves, one forward like a gravity wave and one backward like an EM wave, which is unlike the present invention.

In like to the aforementioned experiments, the composition of the dielectric material in the ES capacitor will require unique properties to insure the occurrence of time dilation and retardation in the present invention. Such dielectric materials could, for example, be:

1) a new Meta-material made to insure the required properties,
2) a leaky dielectric material (i.e., having a small conductivity), as may have occurred with the graphite material at the applied frequency used in the paper by Claude Poher and Danielle Poher, entitled "Gravity & Matter Quantum Behavior from Accelerations, during Electric discharges into Graphite-Based Superconductor," *Applied Physics Research*; Vol. 12, No. 3; 2020,
3) an electrets, as example, that discussed by Ronald J. Kita in U.S. Pat. No. 8,901,943, entitled "Gravitational Attenuating Material," Dec. 2, 2014, or
4) a superconductor, specifically a superconductor having Josephson junction(s).

or other dielectric materials not covered by the above list.

SUMMARY

The present invention is directed to a method, comprising a layered capacitor system composed of an electrostatic (ES) capacitor, i.e., a dielectric with no outer electrode, on an AC capacitor, on a DC capacitor having a (earth) ground (EG), where the time dilation and retardation is produced between the ESQFs at the electrodeless surface of the dielectric material of the ES capacitor and the ESQFs at the surface of the (earth) ground (EG) of the DC capacitor.

The AC capacitor shares an electrode on one side with the ES capacitor and on the other side with the DC capacitor, where the application of an AC voltage to the AC capacitor causes the ESQFs at the electrodeless surface of the dielectric material of the ES capacitor to change, while the DC capacitor acts as a shield against the AC effects from the AC capacitor to cause no change to the ESQFs at the surface of the (earth) ground (EG) of the DC capacitor. When used about a craft, the DC capacitor also provides shielding to the interior of the craft to protect hardware and personnel from the effects of the changing AC voltage and changing quantum energy fields about the craft. Under optimal operations, as the ESQFs is only being changed at the surface of the craft and the effects are shielded by the DC capacitor, hardware and personnel within the craft will not experience the acceleration no the craft.

Other embodiments of the present invention are possible and discussed herein.

It is a feature of the present invention to provide a method for creating a rapidly changing asymmetric energy shell of quantum fluctuations (ESQFs) about a mass for acceleration without mass ejection, as was shown under a new quantum gravity model.

DRAWINGS

FIG. 2A is case 1 and FIG. 2B is case 2.

Figure 2:
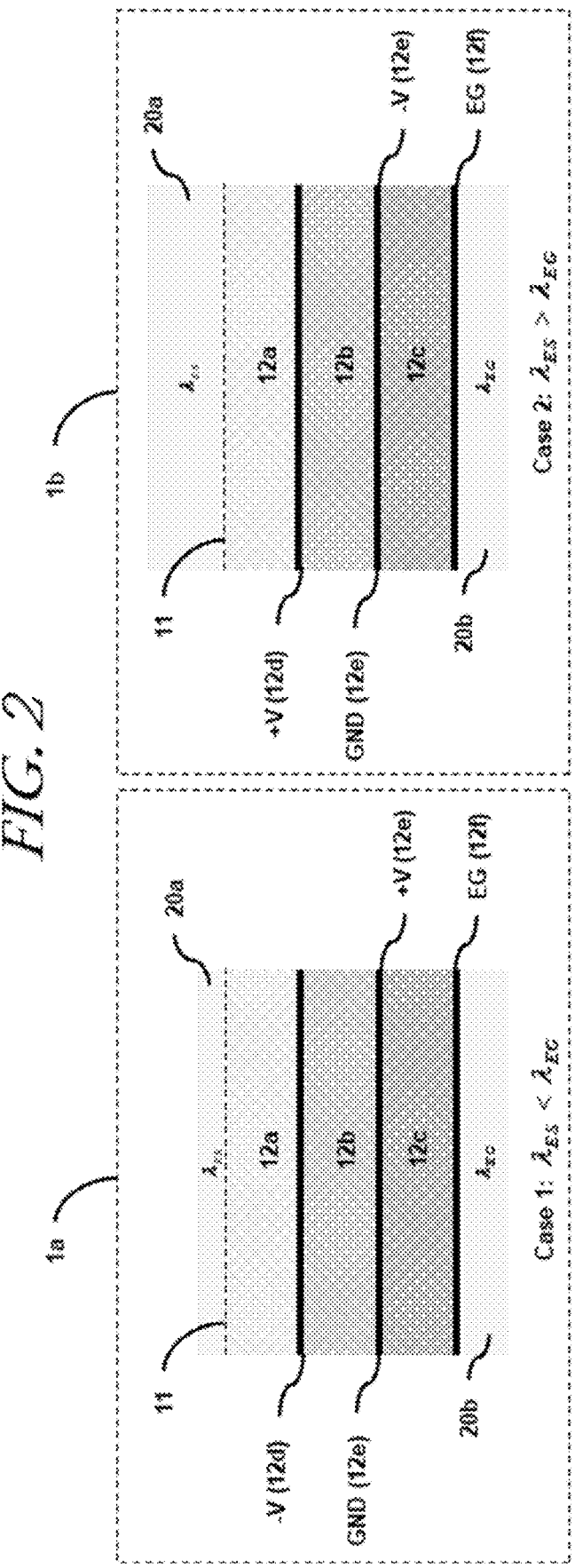
FIG. 2 shows an illustration of the two cases of voltage application to the electrode in the present invention.
Figure 3:
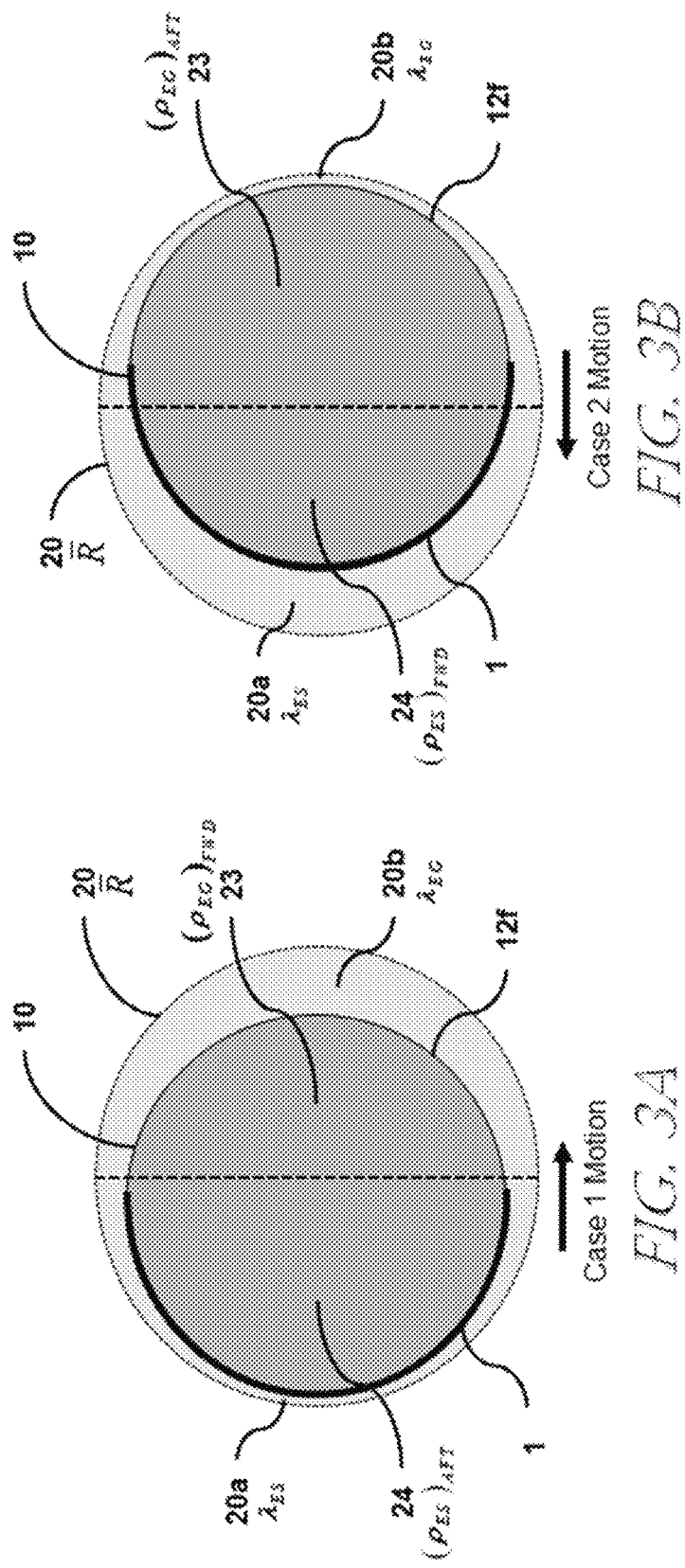

FIG. 3 shows an illustration of the two cases in FIG. 2 about a spherical mass to illustrate the directional motion produced from an asymmetric ESQFs about a mass. FIG. 3A is case 1 and 3B is case 2, showing that the motion direction in case 1 is opposite that of case 2.

Figure 4:
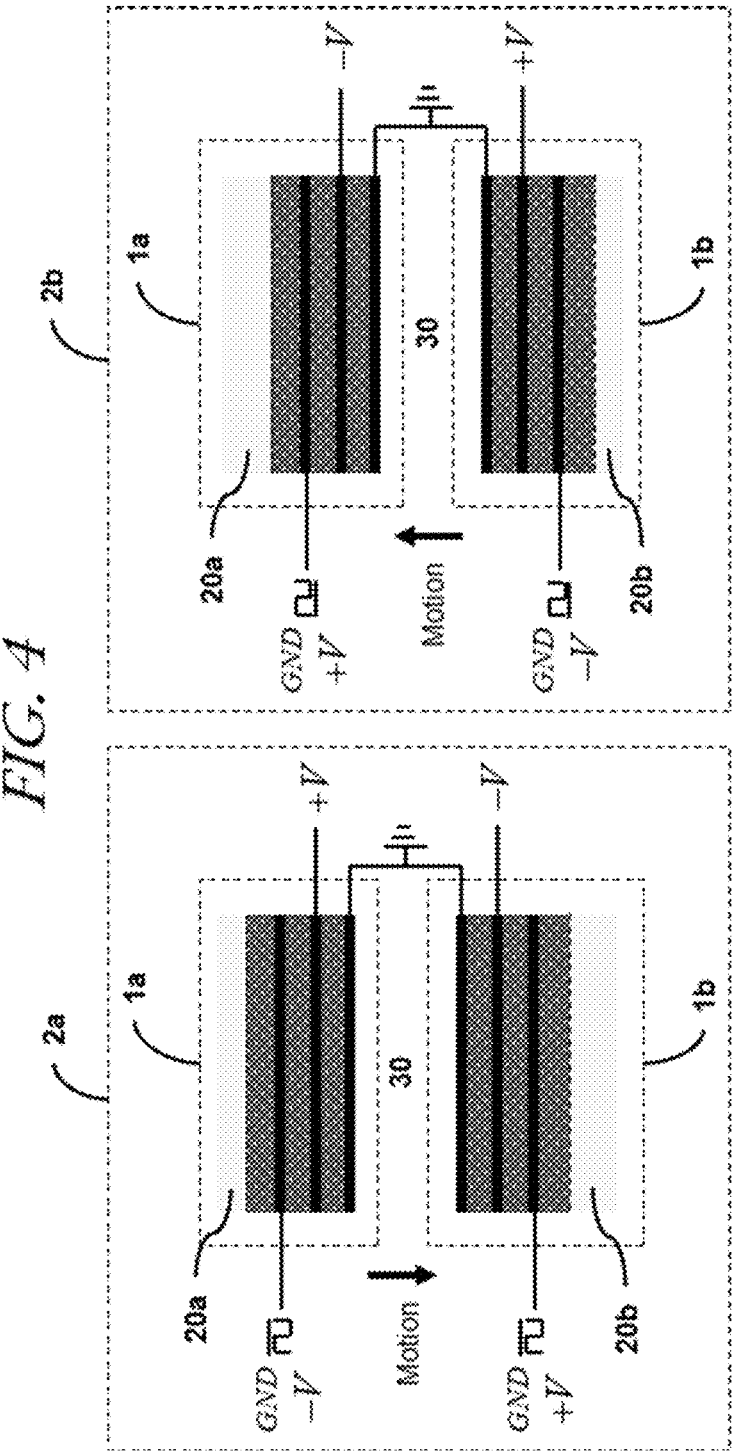

FIG. 4 illustrates a second embodiment of the present invention to illustrate a method to control directional acceleration using two layered capacitor systems mirrored with opposite applied voltages of case 1 of FIG. 2A and case 2 of FIG. 2B with a cavity between them. FIG. 4A is show case 1 of FIG. 2A over case 2 of FIG. 2B. FIG. 4B is show case 2 of FIG. 2B over case 1 of FIG. 2A.

Figure 5:
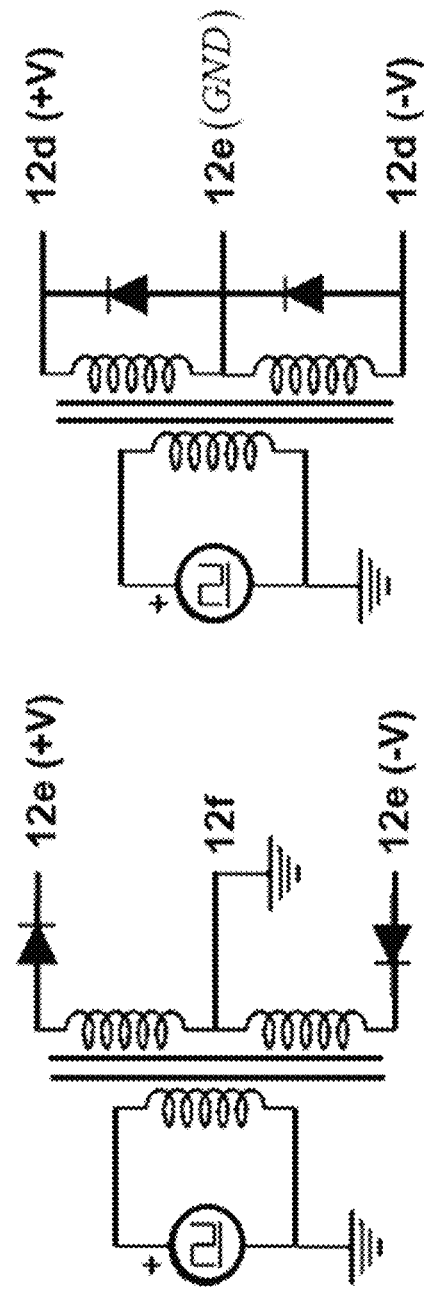

FIG. 5 illustrate examples of flyback circuits that can be used to apply high voltages to the electrodes in the present invention. FIG. 5A illustrates a flyback circuit for producing a positive and negative DC voltage. FIG. 5B illustrates a flyback circuit for producing a positive and negative AC voltage.

Figure 1:
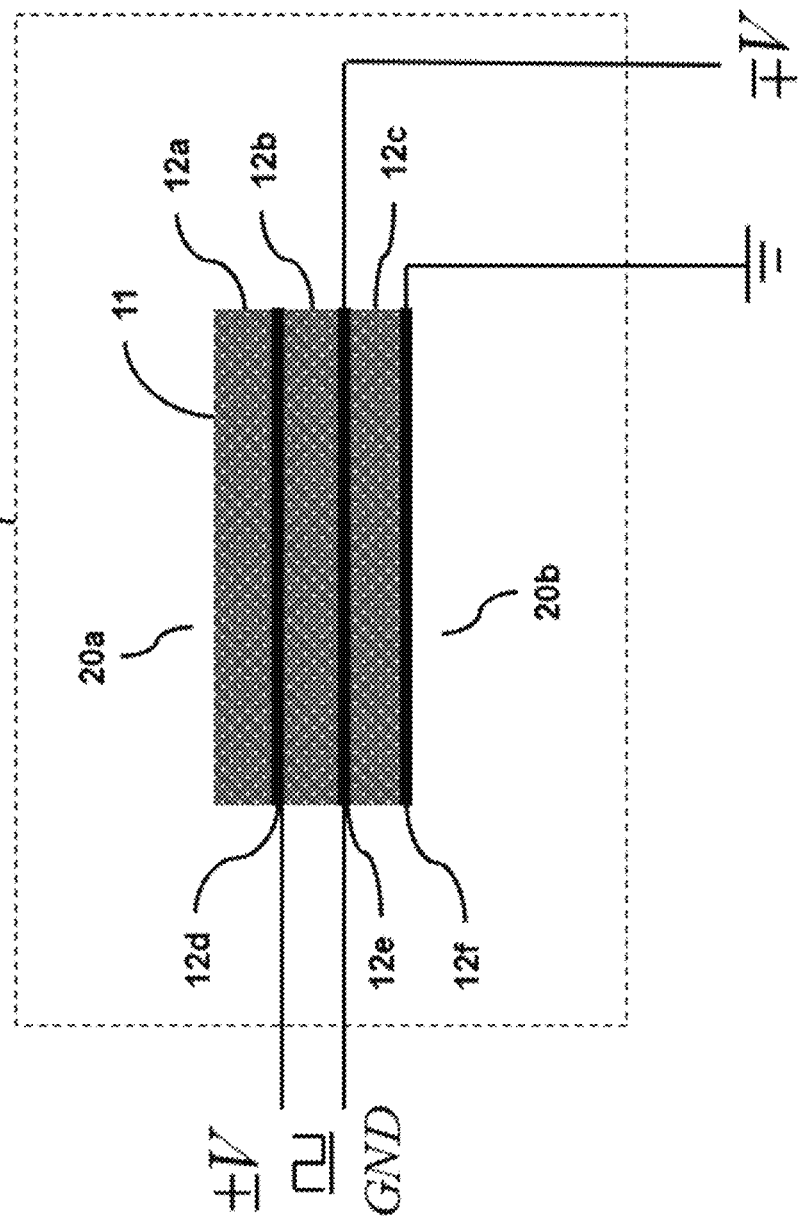
FIG. 1 shows an illustration of a first embodiment of the present invention to illustrate the main function of the method.
Figure 6:
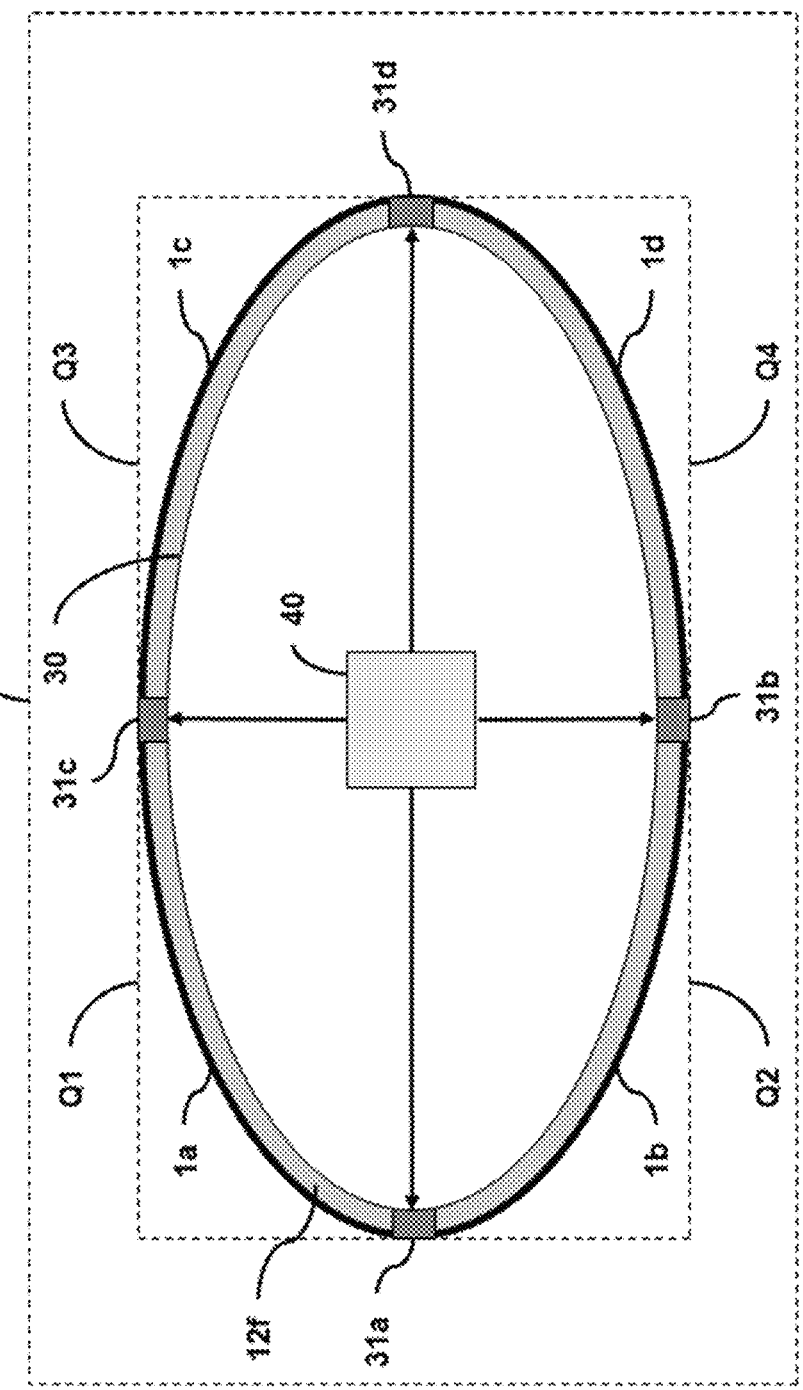

FIG. 6 illustrates a craft having four quadrants of the embodiment of FIG. 1 to show how the present invention can be used by a craft for directional flight.

DESCRIPTION

The preferred embodiments of the present invention are illustrated by way of example below and in FIGS. 1-6. In reference to the online peer reviewed paper by the inventor entitled "Quantum Gravity as a Quantum Warp Field," on Research Gate, the General Science Journal, and LinkedIn websites, equally distributed about masses is an energy shell of quantum energy fluctuations (ESQFs) 20, having a thickness equivalent to the wavelength of the quantum energy in the ESQFs 20. It is understood that the ESQFs 20 has a thickness on the order of subatomic particles, where the ESQFs 20a and 20b, about the layered capacitor system 1 in FIG. 1 and about the layered capacitor systems 1a and 1b in FIG. 2-4, are greatly exaggerated to enhance understanding.

Referring to FIG. 1, where FIG. 1 illustrates the layered capacitor system 1 in the present invention, comprising an outward electrostatic (ES) capacitor, middle AC capacitor, and inward DC capacitor. The ES capacitor has an outer surface 11 with attached upper ESQFs 20a, dielectric material 12a and electrode 12d, the AC capacitor has an outward electrode 12d shared with the outer ES capacitor, dielectric material 12b and inward electrode 12e, and the DC capacitor has an outward electrode 12e shared with the AC capacitor, dielectric material 12c and inward electrode 12f with attached lower ESQFs 20b. In FIG. 1, the ESQFS 20 about the layered capacitor system 1 is illustrated only on the top (20a) and bottom (20b). It is understood that the ESQFS 20 is equally distributed about the layered capacitor system 1, when not under any applied voltages (V). Further, it is understood that the dielectric materials 12a, 12a and 12c can be composed of different materials, know or yet to be discovered, without taking away from the intent of the present invention. Specially the dielectric material 12a in the ES capacitor could be of designed to enhanced the acceleration of the internal displacement current, i.e., the acceleration of the quantum energy field, in the dielectric material 12a.

In FIG. 1, the surface 11 does not have an electrode for electrons to gather upon, when the dielectric material 12a is under a positive or negative (±V) voltage on electrode 12d. The electrode 12f is the DC voltage (earth) ground ($\frac{\bot}{\bot}$), whereby the attached lower ESQFS 20b does not change under the applied positive or negative (±V) voltages, and the electrode 12e is the AC ground (GND). It is understood that the DC voltage (earth) ground ($\frac{\bot}{\bot}$) on the electrode 12f and the AC ground (GND) on electrode 12e are not attached, as such the AC ground (GND) electrically floats from the (earth) ground).

The layered capacitor system 1 in FIG. 1, operates by first applying a negative or positive ($\mp$V) voltage to electrode 12e to establish a DC voltage across the dielectric material 12c, with respect to the (earth) ground ($\frac{\bot}{\bot}$) on the electrode 12f. When a positive or negative (±V) AC ($\sqcap\sqcup$) voltage is applied to electrode 12d, with respect to the AC ground (GND) on electrode 12e and having magnitude opposite to the DC voltage applied to the electrode 12e, to establish an AC voltage across the dielectric material 12b. The electrode 12d establishes an oscillatory (AC) displacement current or accelerated quantum energy field in the dielectric material 12a, that changes the wavelength λ of the quantum energy in the upper ESQFs 20a, to change the quantum energy in the ESQFs 20a. As the quantum energy, and thus the wavelength λ, in the lower ESQFs 20b does not change, an asymmetry between the wavelengths λ in the upper ESQFs 20a and lower ESQFs 20b is produced to apply an acceleration ($a_{ES}$) to the dielectric material 12a, with respect to equation 1.

It is understood that the dielectric material 12c effectively acts as a shield from the effects of the AC voltage across the dielectric material 12b. Further, it is understood that the acceleration ($a_e$) of the quantum energy field in the dielectric material 12a will be a property of the dielectric material 12a, the magnitude V of the applied AC voltage to electrode 12d, and the frequency f≈1/t of the applied voltage to electrode 12d, per Equation 7. Further, it is understood that the application of the AC voltage can be short impulses with an irregular frequency without taking from the intent of the present invention. Even further, it is understood that the dielectric materials 12a and 12b should have low resistive heating to the AC displacement current produced in them by the AC voltage. And still further, it is understood that the dielectric strengths of the dielectric materials 12a, 12b, and 12c will be at a level as to prevent arcing though them at the voltages applied.

Referring to FIG. 2, where FIG. 2 illustrates the two cases for the application of the voltages on the electrodes 12e and 12d of the layered capacitor system 1 in FIG. 1, to impose two different acceleration directions on the quantum energy field in the dielectric material 12a. It is understood that there is no acceleration of the quantum energy field in the dielectric material 12c and, therefore, no acceleration imposed on the three layered capacitor system 1. Further it is understood that the electrode 12e and electrode 12d absorb the quantum energy from the oscillatory (AC) quantum energy field in the dielectric material 12b caused by the applied AC voltages, to impose no net acceleration on the three layered capacitor system 1.

FIG. 2A is case 1, showing the layered capacitor system 1a, where a positive DC voltage (+V) is applied to electrodes 12e and a negative AC voltage (-V) is applied to electrode 12d, both having the same voltage magnitude. The AC ground (GND), on electrode 12e, and the (earth) ground (EG) ($\frac{\bot}{\bot}$), on the electrode 12f, are as stated for FIG. 1. The negative AC voltage (-V) on the electrode 12d is imposed on the dielectric material 12a, going from zero voltage to negative voltage (-V) to zero voltage at the applied frequency f. Producing an acceleration $-v_e f$ on the quantum energy field in the dielectric material 12a toward the electrode 12d, due to the negative electron density $\rho_e$ on electrode 12d.

In FIG. 2A, the quantum energy, thus wavelength $\lambda_{ES} \equiv \lambda_{AFT}$, in the upper ESQFs 20a is decreased (-), while the quantum energy, thus wavelength $\lambda_{EG} \equiv \lambda_{FWD}$, in the lower ESQFs 20b does not change due to the time dilation and retardation imposed between the upper ESQFs 20a and the lower ESQFs 20b, causing the acceleration $a_{ES}$ on the layered capacitor system 1a per Equation 1 to be toward the electrode 12f as $\lambda_{ES} < \lambda_{EG}$ or toward the lower ESQFs 20b, having the lower quantum energy, $E_{EG} \propto 1/\lambda_{EG}$, than the higher quantum energy $E_{ES} \propto 1/\lambda_{ES}$, to produce a thrust $T_{-V}$ on the layered capacitor system 1, per Equation 12.

FIG. 2B is case 2, showing the layered capacitor system 1b, where a negative DC voltage (-V) is applied to electrodes 12e and a positive AC voltage (+V) is applied to electrode 12d, both having the same voltage magnitude. The AC ground (GND), on electrode 12e, and the (earth) ground (EG) ($\frac{\bot}{\bot}$), on the electrode 12f, are as stated for FIG. 1. The positive AC voltage (+V) on the electrode 12d is imposed on the dielectric material 12a, going from zero voltage to positive voltage (+V) to zero voltage at the applied frequency f. Producing an acceleration $+v_e f$ on the quantum energy field in the dielectric material 12a away from electrode 12d, due to the positive electron density $\rho_e$ on electrode 12d.

In FIG. 2B, the quantum energy, thus wavelength $\lambda_{ES} \equiv \lambda_{FWD}$, in the upper ESQFs 20a is increased (+), while the quantum energy, thus wavelength $\lambda_{EG} \equiv \lambda_{AFT}$, in the lower ESQFs 20b does not change due to the time dilation and retardation imposed between the upper ESQFs 20a and the lower ESQFs 20b, causing the acceleration $a_{ES}$ on the layered capacitor system 1b per Equation 1 to be toward the surface 11 as $\lambda_{ES} > \lambda_{EG}$ or toward the upper ESQFs 20a, having the lower quantum energy, $E_{ES} \propto 1/\lambda_{ES}$ than the higher quantum energy $E_{EG} \propto 1/\lambda_{EG}$, to produce a thrust $T_{+V}$ on the layered capacitor system 1, per Equation 12.

With reference to FIG. 3, FIG. 3 illustrates case 1 and 2 in FIG. 2 with the layered capacitor system 1 of FIG. 1 placed about the left half surface of a spherical mass 10, and with the electrical ground ($\frac{\bot}{\bot}$) electrode 12f surrounding the mass 10, to illustrate the directional motion produced from the asymmetric ESQFS 20 about the mass 10 and layered capacitor system 1. The dashed circle on the outward part of the ESQFs 20 represent the outer radius $\overline{R}$ of the ESQFs 20. In FIG. 3, the spherical mass 10 is shifted in the outer radius $\overline{R}$ of the ESQFs 20 due to the applied voltages of case 1 in FIG. 3A or case 2 in FIG. 3A. With reference to FIG. 2A and per Equation 3, the quantum energy wavelength $\lambda_{ES}$ in ESQFs 20a and $\lambda_{ES}$ in ESQFs 20b, produce the different quantum field densities 24 ($\rho_{ES}$) and 23 ($\rho_{EG}$) within the ESQFs 20. It is understood that as the layered capacitor system 1 is placed about the outer surface of the mass 10, it controls the ESQFs 20 about the mass 10.

FIG. 3A is case 1 in FIG. 2A illustrating, the center of the ESQFs 20 by the vertical dashed line that also divides the mass 10 to illustrate the density distributions 24 $(\rho_{ES})_{AFT}$ and 23 $(\rho_{EG})_{FWD}$ in the ESQFs 20, where the densities $(\rho_{ES})_{AFT} > (\rho_{ES})_{FWD}$. Per Equation 4 and as in FIG. 2A, the motion (dark arrow) is toward ESQFs 20b, having the lower quantum energy $E_{FWD} \propto (\rho_{ES})_{FWD}$, than the higher quantum energy $E_{AFT} \propto (\rho_{ES})_{AFT}$ in ESQFs 20a.

FIG. 3B is case 2 in FIG. 2B illustrating, the center of the ESQFs 20 by the vertical dashed line that also divides the mass 10 to illustrate the density distributions 24 $(\rho_{ES})_{FWD}$ and 23 $(\rho_{ES})_{AFT}$ in the ESQFs 20, where the densities $(\rho_{ES})_{AFT} > (\rho_{ES})_{FWD}$. Per Equation 4 and as in FIG. 2A, the motion (dark arrow) is toward ESQFs 20a, having the lower quantum energy $E_{FWD} \propto (\rho_{ES})_{FWD}$ than the higher quantum energy $E_{AFT} \propto (\rho_{EG})_{AFT}$ in ESQFs 20b.

In reference to FIG. 4 with reference to FIGS. 1-3, FIG. 4 illustrates a system 2 containing the case 1 and 2 in FIG. 2 with respect to FIGS. 1 and 3 to illustrate a method to control directional acceleration using two of the layered capacitor systems 1a and 1b mirrored with opposite applied voltages (case 1 and 2 in FIGS. 2 and 3) with a cavity 30 between them, in which, objects will not feel any affects from either layered capacitor systems 1a or 1b nor experience any inertia due to the acceleration on the total system.

In FIG. 4A, the layered capacitor system 1a is the same as in FIGS. 2A and 3A, and the layered capacitor system 1b is the same as in FIGS. 2B and 3B, to provide an upper ESQFs 20a and lower ESQFs 20b that are controlled simultaneously to provide controlled acceleration (Motion) in the direction of the dark arrow, that can be higher than by controlling the ESQFs 20 about only one layered capacitor system 1.

In FIG. 4B, the layered capacitor system 1a is the same as in FIGS. 2B and 3B, and the layered capacitor system 1b is the same as in FIGS. 2A and 3A, to provide an upper ESQFs 20a and lower ESQFs 20b that are controlled simultaneously to provide controlled acceleration (Motion) in the direction of the dark arrow, that can be higher than by controlling the ESQFs 20 about only one layered capacitor system 1.

FIG. 5 illustrates examples of flyback circuits known in the prior art of electrical power that can be used to apply high voltages to the electrodes in the present invention. FIG. 5A illustrates a flyback circuit for producing a positive (+) and negative (−) DC voltage V that can be applied to the electrode 12e with respect to the (earth) ground (⏚) 12f and FIG. 5B illustrates a flyback circuit for producing a positive (+) and negative (−) AC voltage V that can be applied to the electrode 12d with respect the AC (GND) ground 12e. It is understood that the two flyback circuits in FIG. 5 are only one method known in the prior art of electrical power, that can be used to power the present invention without taking from the intent of the present invention.

With reference to FIG. 6, FIG. 6 illustrates a cross-section of a craft 50 with the layered capacitor system 1 of FIG. 1 place in the four quadrants Q1, Q2, Q3, and Q4 about the craft 50 and indicated separately by layered capacitor systems 1a in quadrants Q1, layered capacitor systems 1b in quadrants Q2, layered capacitor systems 1c in quadrants Q3, and layered capacitor systems 1d in quadrants Q4. It is understood that more or less quadrants of layered capacitor system 1 of FIG. 1 can be placed about a craft without taking from the intent of the present invention.

In FIG. 6, the electrical grounded (⏚) electrode 12f is shared by all the layered capacitor systems 1a, 1b, 1c, and 1d, surrounding the inner cavity 30, and is integral to the outer structure, noted by the electrode 12f, of the craft to maintain the inner cavity 30 at ground (⏚) where the inner cavity 30 provides for placement of a power and control system 40, and other features needed in a craft, i.e., crew compartments, and etc. It is understood that by operating the layered capacitor systems 1a, 1b, 1c, and 1d in the manner discuss for FIG. 4, the features needed in the craft, in the cavity 30, will not feel any affects from the layered capacitor systems 1a, 1b, 1c, and 1d nor experience any inertia due to the acceleration on the total system, when the layered capacitor systems 1a, 1b, 1c, and 1d are optimally operated to only control the ESQFs 20 (per FIGS. 1-4) outside the layered capacitor systems 1a, 1b, 1c, and 1d.

In FIG. 6, the power and control system 40 is connected to the layered capacitor systems 1a, 1b, 1c, and 1d though wires (arrows) to the interface boxes 31a, 31b, 31c, and 31d. The interface boxes 31a, 31b, 31c, and 31d are used to integrate the DC and AC voltages from the power and control system 40 to the respectful layered capacitor systems 1a, 1b, 1c, and 1d for directional control of the craft 50 with respect to FIG. 4. It is understood that the design of the power and control system 40 as well as the wires (arrows) and interface boxes 31a, 31b, 31c, and 31d can be many as known in the prior art of power and control systems. Further it is understood that the direction of the craft 30 can be determined by operating the layered capacitor systems 1a, 1b, 1c, and 1d in the directions desired, as discussed in FIG. 4.

What is claimed is:

1. A method for rapidly changing the energy shell of quantum fluctuations (ESQFs) about masses for acceleration without mass ejection comprising a layered capacitor system, having:

an electrostatic capacitor with a first dielectric material, having an outer surface on said first dielectric material exposed to an upper ESQFs, and an inner surface on said first dielectric material in contact with a first electrode;

an AC capacitor with a second dielectric material in contact with said first electrode, being a positive AC electrode, on one side and in contact with a second electrode, being an AC ground electrode, on the other side;

a DC capacitor with a third dielectric material in contact with said second electrode on one side, being a positive DC electrode, and on the other side in contact with a third electrode, being a DC ground, exposed to a lower ESQFs;

where the DC voltage across said DC capacitor is equal and opposite to the AC voltage across said AC capacitor;

where no oscillatory quantum energy is produced in said DC capacitor, and where said first electrode and said second electrode absorbs the oscillatory quantum energy in said second dielectric material of said AC capacitor, to cause no quantum energy to said lower ESQFs;

when said AC voltage on said first electrode is negative, said DC voltage on said second electrode is positive, and said first dielectric material experiences said AC voltage from said first electrode, from zero voltage to said negative voltage, causing an oscillatory acceleration of said quantum energy field in said first dielectric material, to cause a decreased quantum energy in said upper ESQFs, while said quantum energy in said lower ESQFs does not change, to cause an asymmetry between said upper ESQFs and said lower ESQFs about said layered capacitor system, to cause motion to said layered capacitor system in a first direction;

when said AC voltage on said first electrode is positive, said DC voltage on said second electrode is negative, and said first dielectric material experiences said AC voltage from said first electrode, from zero voltage to said positive voltage, causing an oscillatory acceleration of said quantum energy field in said first dielectric material, to cause an increased quantum energy in said upper ESQFs, while said quantum energy in said lower ESQFs does not change, to cause an asymmetry between said upper ESQFs and said lower ESQFs, to cause motion to said layered capacitor system in a second direction, opposite to said first direction;

thus to produce an acceleration method without mass ejection.

2. The method of claim 1, wherein said first dielectric is a Meta-material.

3. The method of claim 1, wherein said first dielectric is a leaky-dielectric material.

4. The method of claim 1, wherein said first dielectric is an electret material.

5. The method of claim 1, wherein said first dielectric is a superconductor material having one or more Josephson junction layer(s).

6. The method of claim 1, wherein multiple said layered capacitor systems are placed about the surface of a craft, where each said layered capacitor system is placed in different quadrants, to produce motion on said craft by operating said layered capacitor systems in each said quadrant in a manner to cause motion in said first or second direction.

7. A method for rapidly changing the energy shell of quantum fluctuations (ESQFs) about masses for acceleration without mass ejection comprising a first and second layered capacitor system that are mirrored and firmly connected, with a cavity between said layered capacitor systems, wherein said cavity objects will not feel any affects from said layered capacitor systems nor experience any inertia due to the acceleration on said connected layered capacitor systems, where the first and second layered capacitor system have:
- an electrostatic capacitor with a first dielectric material, having an outer surface on said first dielectric material exposed to an upper ESQFs, and an inner surface on said first dielectric material in contact with a first electrode;
- an AC capacitor with a second dielectric material in contact with said first electrode, being a positive AC electrode, on one side and in contact with a second electrode, being an AC ground electrode, on the other side;
- a DC capacitor with a third dielectric material in contact with said second electrode on one side, being a positive DC electrode, and on the other side in contact with a third electrode, being a DC ground, exposed to a lower ESQFs;
- where the DC voltage across said DC capacitor in said first and second layered capacitor system is equal and opposite to the AC voltage across said AC capacitor in said first and second layered capacitor system;
- where said first and second layered capacitor system is separated by a cavity between the DC grounds on the first and second layered capacitor system, with said lower ESQFs on said first layered capacitor system downward and said lower ESQFs on said second layered capacitor system is upward, and with said upper ESQFs on said first layered capacitor system upward and said upper ESQFs on said second layered capacitor system downward;
- where no oscillatory quantum energy is produced in said DC capacitor in said first and second layered capacitor system, and where said first and second electrodes in said first and second layered capacitor system absorb the oscillatory quantum energy in said second dielectric material of said AC capacitor in said first and second layered capacitor system, to cause no quantum energy field change in said cavity;

when said AC voltage on said first electrode in said second layered capacitor system is negative, said DC voltage on said second electrode in said first layered capacitor system is positive, and said first dielectric material in said first layered capacitor system experiences said AC voltage from said first electrode in said first layered capacitor system, from zero voltage to said negative voltage, causing an oscillatory acceleration of said quantum energy field in said first dielectric material in said first layered capacitor system, to cause a decreasing quantum energy in said upper ESQFs of said first layered capacitor system, while said quantum energy in said lower ESQFs of said first layered capacitor system does not change and when said AC voltage on said first electrode in said second layered capacitor system is positive, said DC voltage on said second electrode in said second layered capacitor system is negative, and said first dielectric material in said second layered capacitor system experiences said AC voltage from said first electrode in said second layered capacitor system, from zero voltage to said positive voltage, causing an oscillatory acceleration of said quantum energy field in said first dielectric material in said second layered capacitor system, to cause an increasing quantum energy in said upper ESQFs of said second layered capacitor system, while said quantum energy in said lower ESQFs of said second layered capacitor system does not change, to cause an asymmetry between said upper ESQFs of said first layered capacitor system and said upper ESQFs of second layered capacitor system without causing any quantum energy field change in said cavity, while causing motion of said cavity and, said first and second layered capacitor system in a first direction;

when said AC voltage on said first electrode in said first layered capacitor system is positive, said DC voltage on said second electrode in said first layered capacitor system is negative, and said first dielectric material in said first layered capacitor system experiences said AC voltage from said first electrode in said first layered capacitor system, from zero voltage to said positive voltage, causing an oscillatory acceleration of said quantum energy field in said first dielectric in said first layered capacitor system, to cause an increased quantum energy in said upper ESQFs of said first layered capacitor system, while said quantum energy in said lower ESQFs of said first layered capacitor system does not change, and when said AC voltage on said first electrode in said second layered capacitor system is negative, said DC voltage on said second electrode in said second layered capacitor system is positive, and said first dielectric material in said second layered capacitor system experiences said AC voltage from said first electrode in said second layered capacitor system, from zero voltage to said negative AC voltage, causing an oscillatory acceleration of said quantum energy field in said first dielectric material in said second layered capacitor system, to cause an increased quantum energy in said upper ESQFs of said second layered capacitor system, while said quantum energy in said lower ESQFs of said second layered capacitor system does not change, to cause an asymmetry between said upper ESQFs of said first layered capacitor system and said upper ESQFs of second layered capacitor system without causing any quantum energy field change in said cavity, while causing motion of said cavity and, said first and second layered capacitor system in a second direction, opposite to the first direction;

thus said mirror layered capacitor systems produces an acceleration method without mass ejection and without causing any quantum energy field change in said cavity, wherein said cavity objects will not feel any affects from said layered capacitor systems nor experience any inertia due to the acceleration on said connected layered capacitor systems.

8. The method of claim 7, wherein said first dielectric is a Meta-material.

9. The method of claim 7, wherein said first dielectric is a leaky-dielectric material.

10. The method of claim 7, wherein said first dielectric is an electret material.

11. The method of claim 7, wherein said first dielectric is a superconductor material having one or more Josephson junction layer(s).

12. The method of claim 7, wherein multiple said layered capacitor systems are placed mirrored about the surface of a craft, where each said mirrored layered capacitor system is placed in different mirrored quadrants, to produce motion on said craft by operating said mirrored layered capacitor systems in each said mirrored quadrant, in said manner in claim 7, to cause motion in any direction.

* * * * *